United States Patent [19]

Lange

[11] Patent Number: 4,471,801

[45] Date of Patent: Sep. 18, 1984

[54] ADJUSTABLE VALVE LOCKING SYSTEM

[75] Inventor: Erich Lange, Monchen Gladbach, Fed. Rep. of Germany

[73] Assignee: Rheinische Armaturenund Maschinenfabrik Albert Sempell, Korschenbroich, Fed. Rep. of Germany

[21] Appl. No.: 392,172

[22] Filed: Jun. 25, 1982

[30] Foreign Application Priority Data

Jun. 27, 1981 [DE] Fed. Rep. of Germany ....... 3125347

[51] Int. Cl.³ ............................................ F16K 35/00
[52] U.S. Cl. .................................. 137/385; 137/554; 70/176; 70/179
[58] Field of Search ................. 70/181, 184, 176, 179, 70/DIG. 20, DIG. 27; 137/383, 385, 554; 251/267

[56] References Cited

U.S. PATENT DOCUMENTS

| | | | |
|---|---|---|---|
| 1,341,151 | 5/1920 | Olsen | 137/383 |
| 1,541,216 | 6/1925 | Hendricks | 137/385 |
| 2,439,113 | 4/1948 | Thieme | 70/176 |
| 3,390,943 | 7/1968 | Myers | 137/554 |

Primary Examiner—A. Michael Chambers
Attorney, Agent, or Firm—Thomas H. Murray

[57] ABSTRACT

An adjustable valve locking system for valves in which the axial position of a spindle which carries a valve element is dependent upon rotation of an actuating mechanism. Such a locking system includes an annular member surrounding the valve spindle and rotatable with the actuating mechanism, a connection between the annular member and the valve spindle whereby rotation of the annular member will cause axial movement of the valve spindle, a ring threadedly engaging the outer periphery of the annular member, and a radially-movable locking bolt movable into engagement with the ring to lock the same against axial movement while preventing rotation of the annular member and any linear movement of the valve spindle to lock the same. In accordance with the invention, a radially-movable locking block, separate from the locking bolt, is provided for releasably engaging the aforesaid ring to lock the ring against rotation while permitting axial movement of the same by virtue of its threaded connection to the annular member.

12 Claims, 5 Drawing Figures

ADJUSTABLE VALVE LOCKING SYSTEM

BACKGROUND OF THE INVENTION

The present invention relates to an adjustable valve locking system for valves of the type having a rotatable drive or actuating mechanism for a valve spindle. (e.g., a gate valve). In such systems, a lock housing is secured to a valve housing while an annular member surrounds a valve spindle within the lock housing and is rotatable by the actuating mechanism. A connection is provided between the annular member and the valve spindle whereby rotation of the annular member will cause axial movement of the valve spindle and a valve element carried thereby. This connection may comprise either a splined connection in the case where the spindle rotates or may comprise a threaded connection in the case of a non-rotating or spindle. In either case, the spindle moves in an axial direction within the surrounding annular member as the annular member rotates. A ring threadedly engages the outer periphery of the aforesaid annular member; while a radially-movable locking bolt in the lock housing is moved into engagement with the aforesaid ring to lock the same against axial movement while preventing rotation of the annular member to lock the valve spindle in a selected axial position. The locking bolt is normally movable between locking and unlocking positions by means of a lock cylinder actuated by a removable key. When the aforesaid locking bolt is out of locking engagement with the aforesaid threaded ring, it will move axially upwardly or downwardly due to a rectilinear guidance system such that the valve spindle is free to move until the axially-movable ring moves into position where it can be engaged by the locking bolt to hold it in position.

In one type of prior art locking system of the type described above, the valve can be locked only in its open and closed positions. Lock cylinders are usually used with such locking systems, the key for the lock cylinder being adapted to be withdrawn only when the lock is in a required locking position.

In prior art locking systems of this type the locking positions are preset and cannot be subsequently changed without considerable revision (e.g., to make a valve previously lockable in the open position now lockable in the closed position, or vice versa). Prior art locking systems of this type also have other disadvantages. For example, there may be a considerable difference between the required locking position and the actual locking position in the case of preset positions of this kind. This is due to the cumulative effect of different production tolerances in the case where the locking system is mass produced.

SUMMARY OF THE INVENTION

In accordance with the present invention, an adjustable valve locking system is provided which obviates the aforementioined disadvantages in that the locked position of the valve spindle is adjustable (i.e., it can be varied at will). As in prior art systems, an annular member surrounds a valve spindle within a lock housing and is rotatable by an actuating mechanism. In addition, a connection is provided between the annular member and the valve spindle whereby rotation of the annular member will cause axial movement of the valve spindle. Locking, as in prior art systems, is provided by means of a ring which threadedly engages the outer periphery of the annular member, the ring being engageable by a radially-movable locking bolt which locks the ring against axial movement while preventing rotation of the annular member and any linear movement of the valve spindle.

In order to provide adjustment of the locking position, the invention utilizes a radially-movable locking block which normally engages the ring to lock the same against rotation while permitting axial movement of the same and rotation of the annular member. This locking block is normally secured to the lock housing to hold it in engagement with the ring to prevent rotation of the same. However, additional means are provided for releasing the locking block from the ring, the arrangement being such that when the locking block is released, the ring is free to rotate with the aforesaid annular member while the valve spindle moves axially within the annular member. In this manner, the locked position of the valve spindle can be changed while the locking block is released and after the ring has freely rotated with the annular member. When a desired, new locking position is reached, the locking block is moved radially inwardly into engagement with the ring and engaged therewith to again prevent rotation of the same.

In one embodiment of the invention, gear teeth are provided on the outer periphery of the aforesaid ring, these teeth being adapted to engage cooperating gear teeth on the locking block, the arrangement being such that when the locking block teeth are in engagement with the gear teeth on the ring, the same cannot rotate but can move axially only. Preferably, in order to lock the ring against axial movement after the locking position has been selected, the outer surface of the ring is provided with a peripheral groove in addition to the teeth, this groove receiving the aforesaid radially-movable locking bolt which, when in the groove, prevents axial movement of the ring and locks the valve spindle against movement. A spring resiliently urges the locking bolt into engagement with the side of the ring; but the bolt will lock the ring against axial movement only when it is within the aforesaid peripheral groove.

In the preferred embodiment of the invention, the locking block can be disengaged from the lock housing and can be connected to the radially movable locking bolt such that both may be moved outwardly and out of engagement with the ring with a single key.

For special locking purposes, two lock cylinders can be used with a single locking bolt and are so devised that when in the locked or unlocked position, only one of the two keys can ever be removed.

According to another aspect of the invention, the lock housing is provided with an adjustable support for microswitch contacts to indicate the upper and lower positions of the aforesaid ring. Alternatively, a continuous position display can be provided.

The valve locking system of the invention can be used for valves which are required to be locked in a number of different operating positions. If two locking positions are required, another unit consisting of a locking block and locking bolt is provided in the housing and acts on the threaded ring for the required locking position in the same way as the first unit. If the valve is to be locked in more than two operating positions, a correspondingly lengthened threaded ring is provided and a number of lock and bolt units corresponding to the required locking positions is disposed in the lock housing either adjacent to and/or one above another.

One of the main advantages of the invention is that the locking of the threaded ring against rotation can be released at any time without difficulty to allow subsequent alteration of the preset locking position while, on the other hand, it permits sensitive adjustment to compensate at all times for any deviation from the required position in the case of a preset locking position.

The above and other objects and features of the invention will become apparent from the following detailed description taken in connection with the accompanying drawings which form a part of this specification, and in which.

Figure 1:
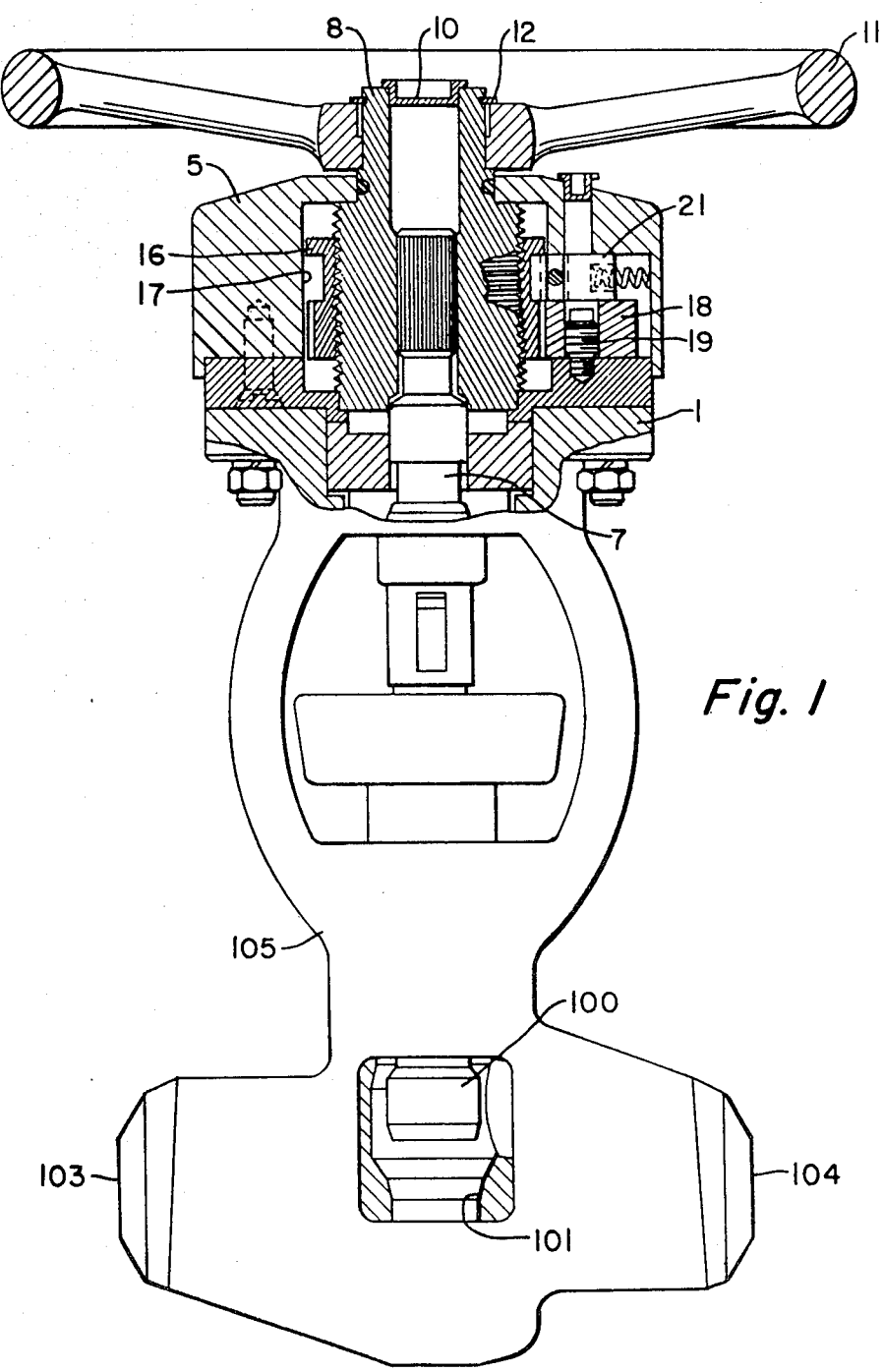
FIG. 1 is an elevational view, partly broken away, of one type of gate valve with which the locking system of the present invention may be used.

With reference now to the drawings, and particularly to FIG. 1, a typical globe valve is shown including a valve element 100 engageable with a valve seat 101. In the position shown, the valve element 100 establishes communication between inlet and outlet ports 103 and 104; however when the valve element 100 moves downwardly and engages seat 101, communication between ports 103 and 104 is blocked.

The valve element 100 is secured to the end of a valve spindle 7 provided with threads which engage threads within a valve housing 105 such that as the spindle 7 rotates, it will move upwardly or downwardly in an axial direction. The upper end of the spindle 7 is splined as shown and is received within a rotatable annular member 8 which, in turn, is secured to a handwheel 11 held in place by lock ring 12. Upon rotation of the handwheel 11, the annular member 8 and spindle 7 will also rotate by virtue of its splined connection to the member 8. At the same time, by virtue of the threads, not shown, on the lower end of the spindle 7, the spindle will move upwardly or downwardly within the annular member 8 as will the valve element 100, depending upon the direction of rotation of member 8.

Figure 2:
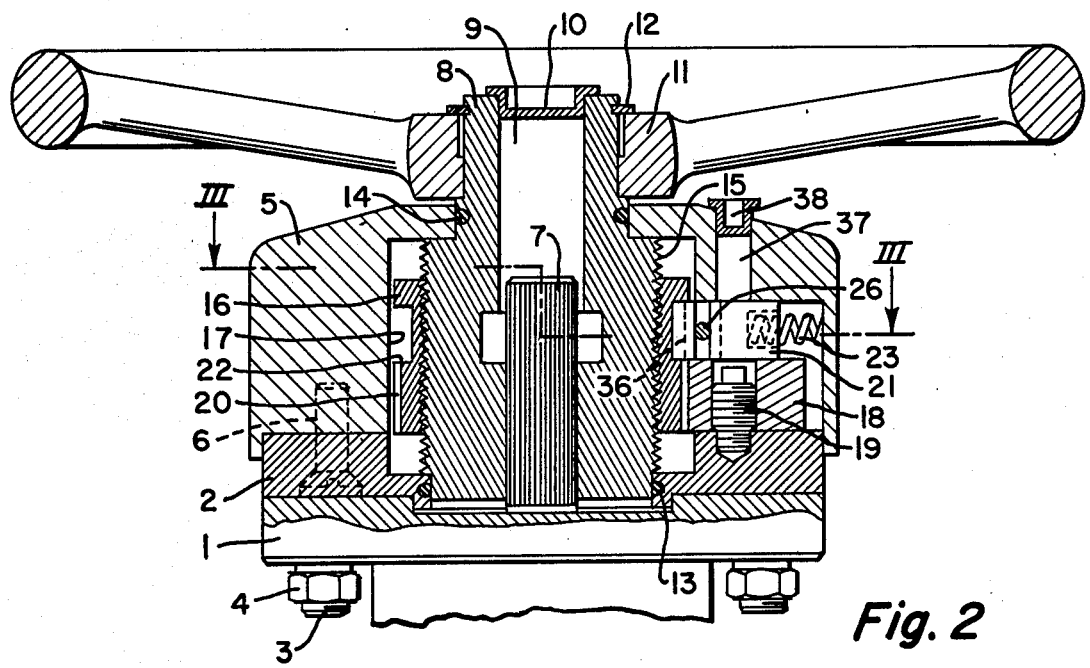
FIG. 2 is an axial cross-sectional view of the adjustable valve locking system of the invention for a valve having a rotating and axially-movable spindle.

In FIG. 2, the details of the locking system of the invention are shown. A connecting flange 1 is provided at the top of the valve housing 105 to which a base plate 2 of the locking system of the invention is rigidly connected by means of bolts 3 and nuts 4. The base plate 2, in turn, carries a lock housing 5 which is rigidly connected to the base plate by means of countersunk screws 6.

The splined upper end of the spindle 7 is received within a bore 9 formed in the rotatable annular member 8, the bore being provided with a removable protective cap 10. The annular member 8 is disposed within a bore 17 in the housing 5 and is provided with suitable ring gaskets 13 and 14 at its opposite ends where it is in sliding engagement with the bore. As was explained above, when the handwheel 11 is rotated, so also will the annular member 8 as well as the splined shaft 7; however as the shaft 7 is rotated, it will move upwardly or downwardly within the bore 9 provided in the annular member 8. The annular member 8 is provided on its outer periphery with threads 15, these threads receiving an annular locking ring 16 which has corresponding threads on its inner periphery. The ring 16 is provided with an annular groove 22 as well as gear teeth 20 on its lower peripheral surface. Gear teeth 20, in turn, are adapted to engage with cooperating gear teeth on a locking block 18, this locking block being held in position on the base plate 2 by means of a threaded pin 19 having a lower end received within a threaded bore in the base plate 2.

It will be appreciated that if the ring 16 is free to move upwardly or downwardly, rotation of the handwheel 11 will cause such upward or downward movement with the gear teeth 20 sliding within the cooperating gear teeth on the locking block 18. If, however, the ring 16 is not free to move upwardly and downwardly, the annular member 8 cannot be rotated and the valve spindle 7, as well as the valve element 100 carried at its lower end, will be locked in a specified position (e.g., fully open or fully closed).

Upward or downward movement of the ring 16 can be prevented, and the valve spindle 7 thereby locked, by means of a radially-movable locking bolt 21 (see also FIG. 2) which is normally urged into abutting engagement with the periphery of the ring 16 by means of a coil spring 23. Assuming that the locking bolt is in alignment with the annular groove 22 in the ring 16, it will snap into the aforesaid annular groove, thereby preventing upward or downward movement of the ring 16 and locking the spindle 7 in position. However, when the locking bolt 21 is removed from the groove 22, the ring 16 is free to move upwardly or downwardly with the gear teeth 20 sliding within the cooperating gear teeth on locking block 18. Under these circumstances, the handwheel 11 and annular member 8 are free to rotate the splined valve spindle 7 which moves upwardly or downwardly within the bore 9 in the annular member 8 as explained above. Assuming that the locking bolt 21 is not aligned with the groove 22, and that there is nothing to restrain the bolt 21 from being urged against the ring 16, the bolt will simply slide on the outer periphery of the ring as it moves upwardly or downwardly.

Figure 3:
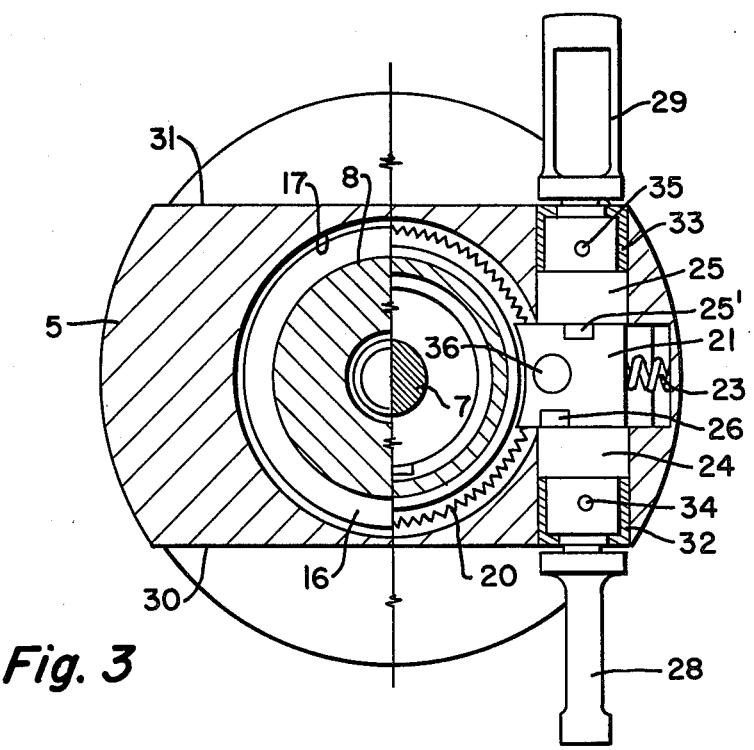
FIG. 3 is a cross-sectional view of the valve locking system of FIG. 2 taken substantially along line III—III in FIG. 2.

In the embodiment of the invention shown, the locking bolt 21 is in sliding engagement with the top surface of the locking block 18. The locking bolt 21, as best shown in FIG. 3, is provided with a bore 36 which can be aligned with the threaded pin 19 in block 18 and with a bore 37 in the lock housing 5, this latter bore being provided with a removable cover 38. In order to align the bore 36 in bolt 21 with the bore 37 and the lock pin 19, the locking bolt 21 must be moved from its position shown in FIG. 2, for example, to the right against the force of spring 23. When the bore 36 is in alignment with bore 37 and pin 19, the pin may be withdrawn from the base plate 2 by rotating it with the use of an Allen wrench, for example, inserted through the aligned bores 36 and 37. When the pin 19 is thus removed from the base plate 2, its upper end will project into the bore 36, whereby further radial outward movement of the locking bolt 21 will carry the locking block 18 with it, thereby disengaging the gear teeth on the locking block 18 from gear teeth 20 on the ring 16. Under these circumstances, when the handwheel 11 and annular member 8 are rotated, the splined spindle 7 will also rotate while moving upwardly or downwardly; however the ring 16 does not move upwardly or downwardly on the threads 15 provided on the outer annular surface of member 8 since there is nothing to restrain it against rotation (i.e., the locking block 18 having been withdrawn from engagement with its peripheray). Assuming, for example, that the spindle 7 is locked in the fully-open position of the valve when block 18 is withdrawn, it can then be rotated to any other position (e.g., fully closed or any intermediate position). When the locking block 18 again engages the gear teeth 20 on ring 16, the spindle will then be adapted to be locked in the other, new locking position.

As is shown in FIG. 3, two locking cylinders 24 and 25 are provided on each of the opposite sides of the locking bolt 21 in order to actuate the same (i.e., to move the locking bolt radially inwardly or outwardly). Each locking cylinder 24 or 25 is provided with an eccentrically-mounted pin 25' or 26 which is received within an associated slot in a side of the locking bolt 21. Cylinders 24 and 25, in turn, can be rotated by means of removable keys 28 and 29 whose positions are displaced with respect to each other by 90°. By turning either one of the keys 28 or 29, it is possible for the locking bolt 21 to be moved from the locking positions shown in FIGS. 2 and 3 into a radially-outward unlocking position in which the inner end of the bolt 21 is no longer received within the groove 22 in the ring 16. As shown in FIG. 3, the lock housing 5 is provided with two straight, parallel wall portions 30 and 31; and the lock cylinders 24 and 25 are disposed in bores formed in these wall portions. Bushings 32 and 33 are fitted over the outer smaller-diameter portions of the cylinders 24 and 25 and are held in position with respect to the housing 5 by means of set screws 34 and 35. Lock cylinders 24 and 25 are provided with keyholes adapted to receive the keys 28 and 29, the arrangement being such that neither one of the keys can be removed from its associated keyhole unless it is in a predetermined angular position, as is conventional with most cylinder locks. However, the angular position in which key 28 can be removed is displaced with respect to the angular position in which key 29 can be removed by 90°. Likewise, the positions of the eccentric pins 25' and 26 are displaced 90° with respect to each other. Thus, when one key can be removed, the other cannot.

In this way, it is possible to lock more than one valve in a system in a predetermined sequence since if one valve is locked by key 28, for example, key 29 can be removed and used to lock a second valve, and so on.

In the operation of the locking system of the invention, when the locking bolt 21 has been moved radially outwardly against the force of spring 23 by either one of the locking cylinders 25 or 24, the valve spindle 7 can be moved into any desired position, but can be relocked only in its original starting position where the groove 22 is aligned with the locking bolt 21. In this position of alignment, the spring 23 can force the bolt 21 into the groove 22 such that the ring 16 cannot move upwardly or downwardly on the threads 15, and the annular member 8 cannot be rotated.

Figure 5:
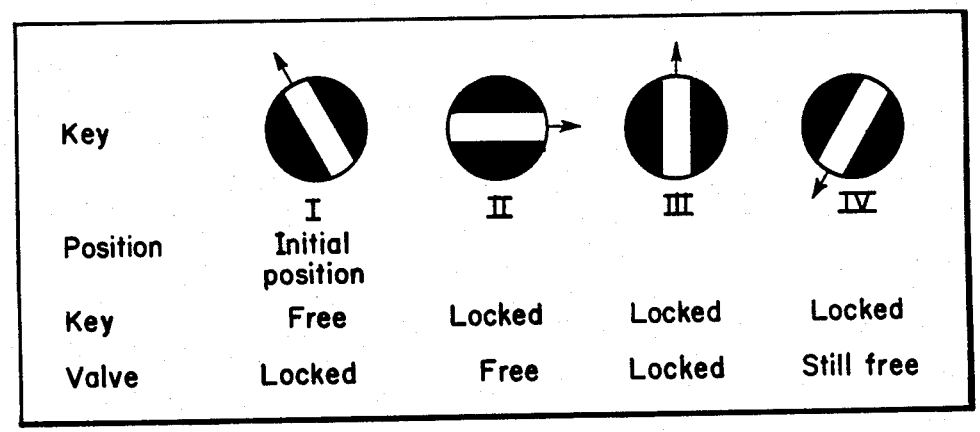
FIG. 5 is an illustration of the various positions of the key in the lock cylinder for the locking system of the invention.

The position of the key 28 for various locked and unlocked conditions is shown in FIG. 5. Only when the key 28 is in the angular position I, can it be inserted or removed from the lock cylinder 24. To release the spindle 7 for rotation, the key 28 is inserted and turned as far as it will turn in the clockwise direction to position II shown in FIG. 5. Locking bolt 21 is thereby moved radially outwardly and out of the groove 22, thereby releasing the ring 16 for up and down movement within bore 17. As ring 16 moves up or down from its locked position, with gear teeth 20 sliding within cooperating gear teeth on locking block 18, the locking bolt 21 cannot reenter the groove 22 until the two are again aligned in the locking position. This is true even though the key should be rotated in a counterclockwise direction. However, since the locking bolt 21 cannot reenter the groove 22 until the two are again aligned, the key 28 cannot be removed except under the circumstances of alignment.

In order to relock the valve, the key 28 is turned in the counterclockwise direction as far as it will go (position IV in FIG. 5). Assuming that the locking block 18 and groove 22 are not aligned at this time, the block 18 will simply slide on the outer periphery of the ring 16 as explained above. However, when the ring 16 again moves into a position where the groove 22 is aligned with block 18 (i.e., the locked position of the spindle 7), spring 23 will force the bolt 21 into groove 22, thereby locking the spindle in its locked position. Key 28 can now be rotated to position I shown in FIG. 5 and removed.

The locking position of the ring 16 can be changed as follows: The key 28 is inserted in position I in FIG. 5 and rotated in a clockwise direction to position III. In this position, the bore 36 is in alignment with bore 37 as well as the locking pin 19. Cap 38 is removed and an Allen wrench then inserted through the bores 36 and 37 to rotate and move upwardly the pin 19 until it clears the bore in the base plate 2. When the pin 19 clears the upper end of the base plate 2, the upper end of the pin will be within the bore 36 such that block 18 and bolt 21 will move inwardly or outwardly in a radial direction as a unit. The Allen wrench is then removed and the key 28 is moved in a clockwise direction as far as it will go (i.e., position II in FIG. 5). In this position, the bolt 21 together with the block 18 are moved radially outwardly and the teeth on the block 18 are disengaged from those on the ring 16. Under these circumstances, the ring 16 is free to rotate with the handwheel 11 and annular member 8; and it will not move upwardly or downwardly on the threaded outer periphery of the annular member 8 since it is no longer restrained against rotation. When the handwheel 11 has been rotated to a new, desired locking position, key 28 is turned in a counterclockwise direction from position II in FIG. 5 to position III where bore 36 is again aligned with bore 37 and the teeth on locking block 18 engage the cooperating teeth 20 on ring 16. With the use of an Allen wrench, the pin 19 is then rotated such that it moves downwardly and into the bore provided in the base plate 2, thereby preventing movement of the block 18. After the pin is in the position shown in FIG. 2, for example, the Allen wrench is removed and the locking bolt, under the force of spring 23, automatically forces it into the groove 22 in ring 16. At the same time, the key 28 can be turned to position I in FIG. 5 where it can be removed from the locked cylinder.

If a valve is required to be locked in a number of different positions, a corresponding number of the locking systems described above can be disposed one above the other in a lock housing similar to lock housing 5 shown in FIG. 2. In this case, the ring 16 will have to have two or more annular grooves 22, depending upon the number of locked positions desired.

Figure 4:
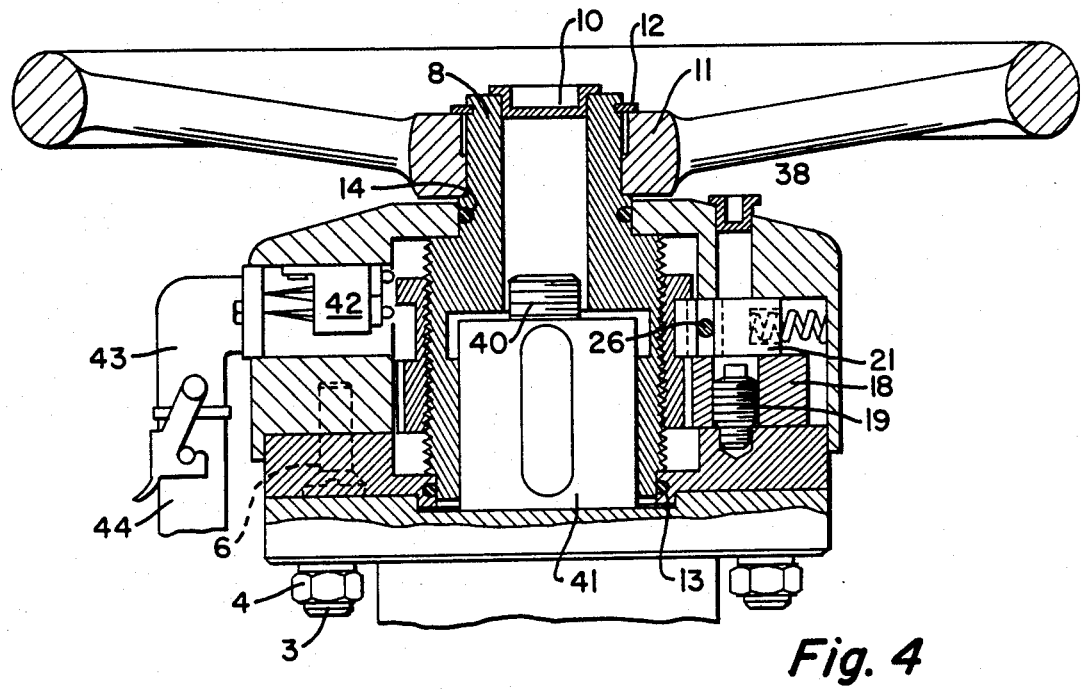
FIG. 4 is an axial cross-sectional view similar to that of FIG. 2 but for a valve having a non-rotating axially-movable spindle.

In FIG. 4, another embodiment of the invention is shown wherein elements corresponding to those of FIG. 2 are identified by like reference numerals. In this case, however, the upper end of the valve stem 40 is threaded and received within an internally-threaded bushing 41 carried by the annular member 8. Thus, as the handwheel 11 and member 8 rotate, the threaded connection between the bushing 41 and valve stem 40 will cause it to move upwardly or downwardly without rotating. Other than that, the operation is the same as previously described. In FIG. 4, a microswitch 42 is provided for indicating the axial position of the ring 16. Electrical leads run from the microswitch 42 to a standard plug socket 43 to which a removable plug 44 can be connected.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In an adjustable valve locking system for valves in which the axial position of a valve spindle in a valve housing is dependent upon rotation of an actuating mechanism and wherein the locking system includes (1) a lock housing secured to said valve housing, (2) an annular member surrounding said valve spindle within said lock housing and rotatable with said actuating mechanism, (3) a connection between said annular member and the valve spindle whereby rotation of the annular member will cause axial movement of the valve spindle, (4) a ring threadedly engaging the outer periphery of said annular member, and (5) a radially- movable locking bolt in the lock housing movable into engagement with said ring to lock the same against axial movement while preventing rotation of the annular member and any linear movement of said valve spindle to lock the same in a selected axial position; the improvement of said system comprising:

a radially-movable locking block for releasably engaging said ring to lock the same against rotation while permitting axial movement of the same and simultaneous rotational movement of said annular member, said locking block being normally secured to said lock housing to hold said block in engagement with said ring to prevent rotation of the same, and means for releasing the locking block from said ring, the arrangement being such that when the locking block is released the ring is free to rotate with said annular member while said valve spindle moves axially within said annular member, whereby the locked position of the valve spindle will be changed after the ring freely rotates with the annular member and said locking block is then moved radially inwardly into engagement with the ring and engaged therewith to again prevent rotation of the same.

2. The improvement of claim 1 wherein the means for releasing includes means for securing the locking block to the locking bolt whereby radial outward movement of the bolt will carry the block with it to disengage it from said ring.

3. The locking system of claim 1 wherein the outer periphery of said ring is provided with gear teeth engageable with gear teeth on the locking block when said block is secured to said lock housing.

4. The improvement of claim 1 including spring means for resiliently urging said locking bolt into locking engagement with said ring.

5. The locking system of claim 4 wherein the spring means urges said locking bolt into an annular recess in said ring.

6. The improvement of claim 4 including a rotatable key for forcing said locking bolt radially outwardly and out of locking engagement with said ring.

7. The improvement of claim 1 wherein said locking block is adjacent said locking bolt, and means for connecting said block to said bolt while disconnecting it from said lock housing, and vice versa.

8. The improvement of claim 7 wherein said connecting means comprises a threaded bolt passing through said block and adapted to be threaded into a bore in said lock housing to secure it to the lock housing while in locking engagement with said ring, and a bore in said locking bolt adapted to be aligned with said threaded bolt when said bolt is moved radially outwardly, whereby rotation of the threaded bolt in one direction will cause it to move out of said bore in the lock housing and into the bore in the locking bolt whereby the bolt and block can be both moved radially outwardly to disengage them from said ring.

9. The improvement of claim 8 wherein said block and bolt are moved radially outwardly by a rotatable key.

10. The improvement of claim 1 including a continuous position display means provided on said lock housing for indicating the actual position of said ring.

11. The improvement of claim 8 including a second bore in said lock housing above said block and aligned with said threaded bolt, whereby a tool may be inserted through said second bore to rotate the threaded bolt.

12. The improvement of claim 8 wherein said block and bolt can be moved radially outwardly by either one of two lock cylinders each provided with a key, one of said cylinders being in a locked position while the other is in an unlocked position and vice versa, and wherein either key can be removed only when its cylinder is in an unlocked position.

* * * * *